Figure 1:
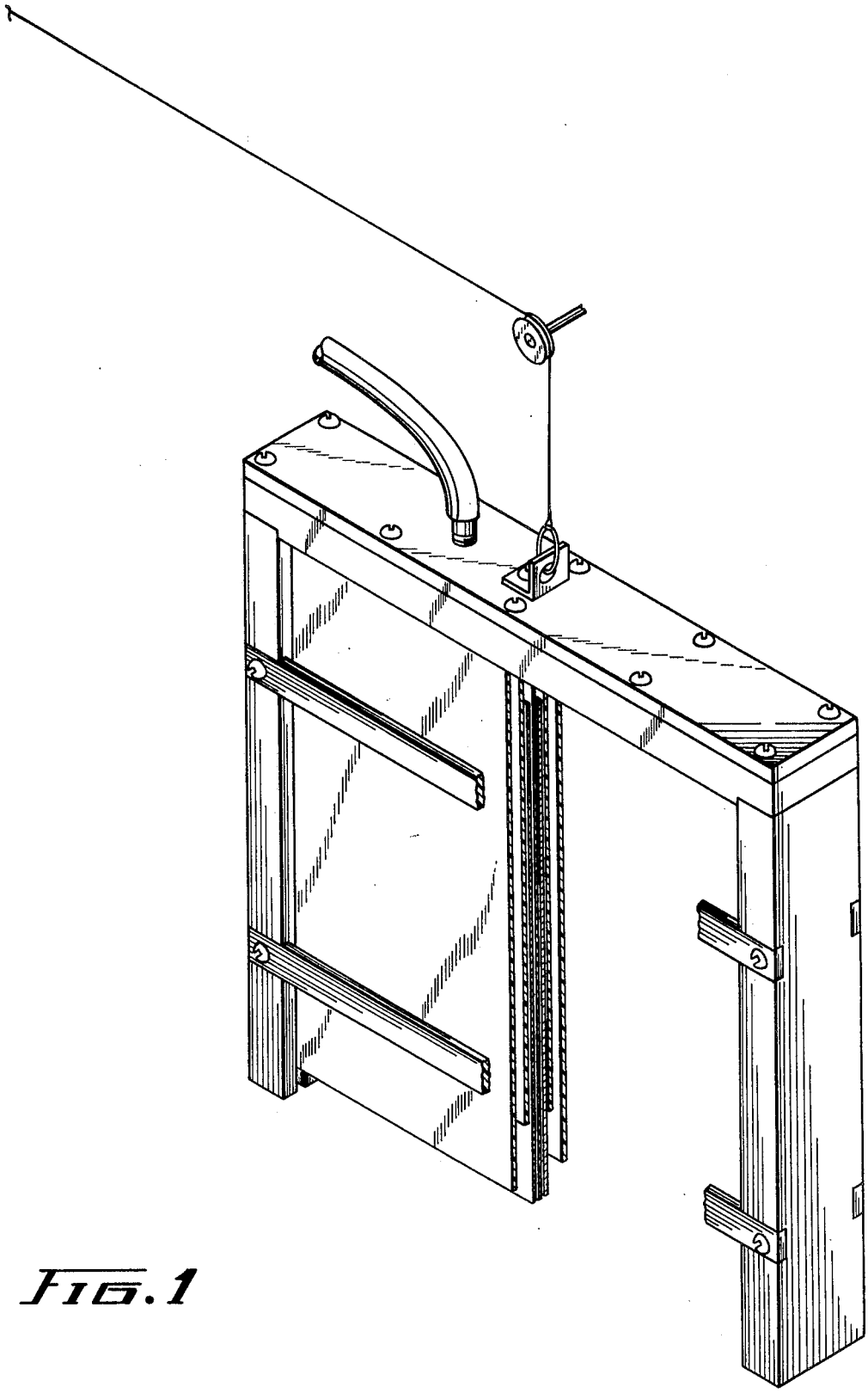
Figure 2:
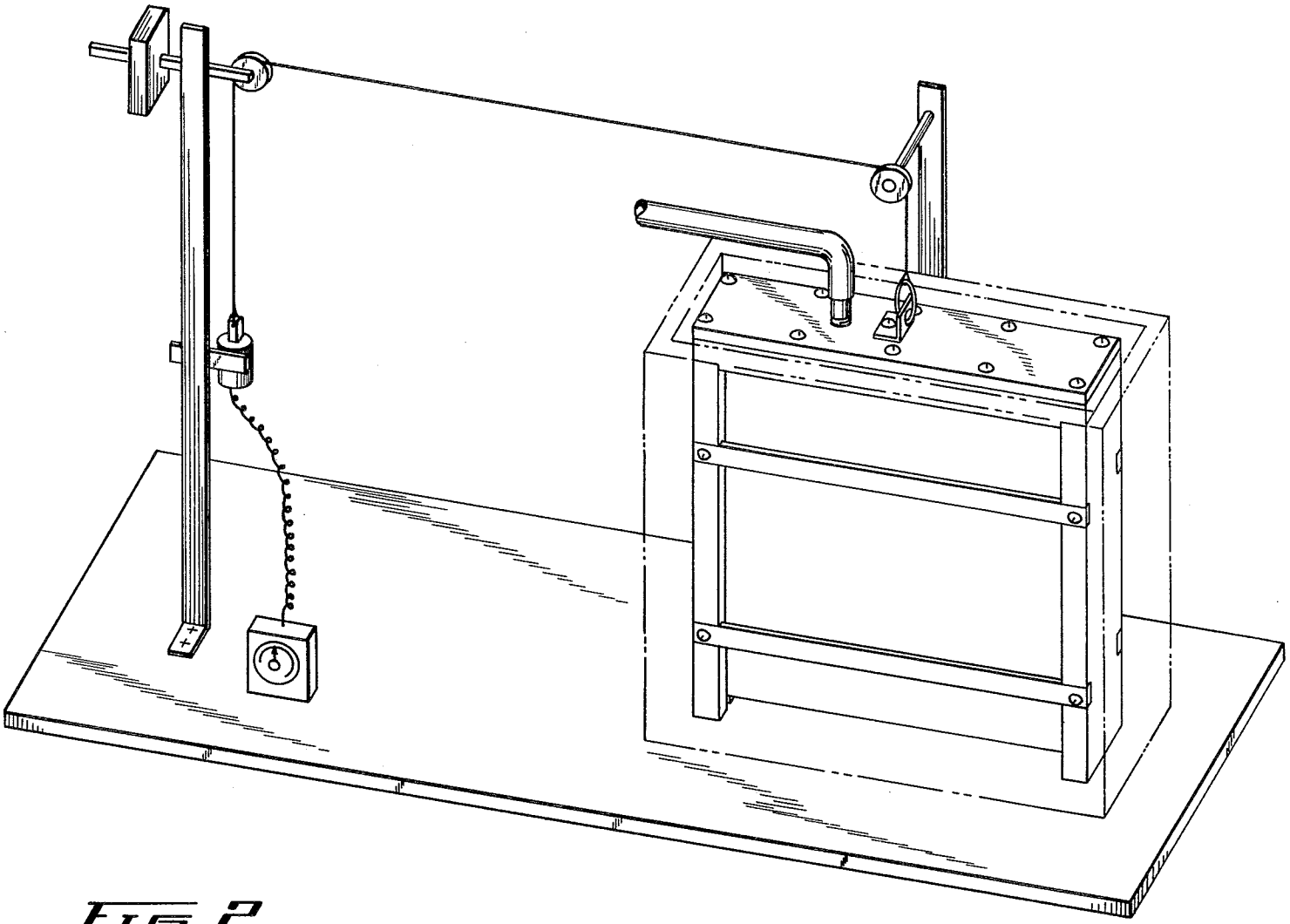
Figure 3:
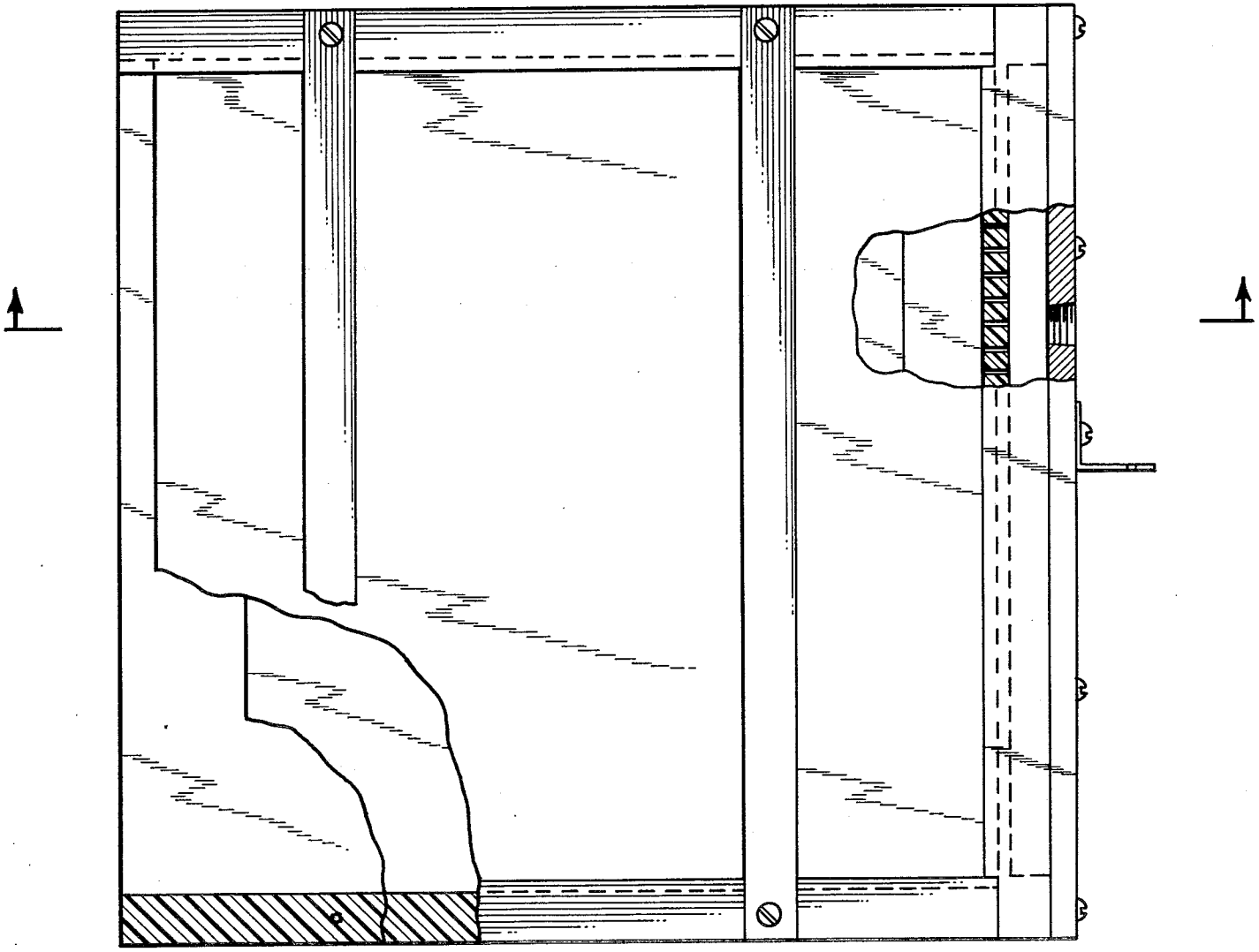
Figure 4:
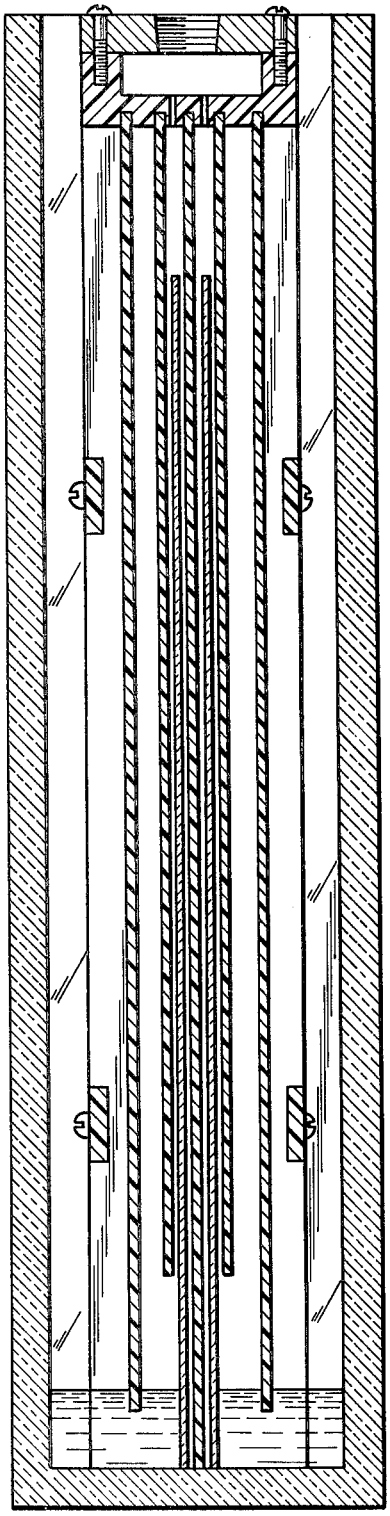

United States Defensive Publication [19] (H) [11] T986,008

Gordon et al. [43] Sep. 4, 1979

[54] APPARATUS FOR HOLDING PLATES BEING SUBJECTED TO MULTIPLE DEVELOPMENT UNDER CONTROLLED TIME

[76] Inventors: Samuel Gordon, 393 Blauvelt Rd., Pearl River, N.Y. 10965; Milon W. Bullock, Hopewell-Woodsville Rd., Hopewell, N.J. 08525

[21] Appl. No.: 6,066

[22] Filed: Jan. 24, 1979

[51] Int. Cl.[2] ..... B01D 15/08

[52] U.S. Cl. ..... 210/198 C

[57] ABSTRACT

A thin layer plate chromatography apparatus having a container for holding an elution solvent, an open bottom frame for holding one or more plates in the container. The frame has at least one aperture for forcing a drying gas such as nitrogen over the plate. Means for raising and dropping the frame in the container is solenoid operated and a timer is connected to the solenoid so a timed sequence is provided for lowering into the reservoir, removal from the reservoir and drying can be varied according to a preset program. Preferably each subsequent development is slightly larger than the prior development.

1 Claim, 4 Sheets Drawing,

7 Pages Specification

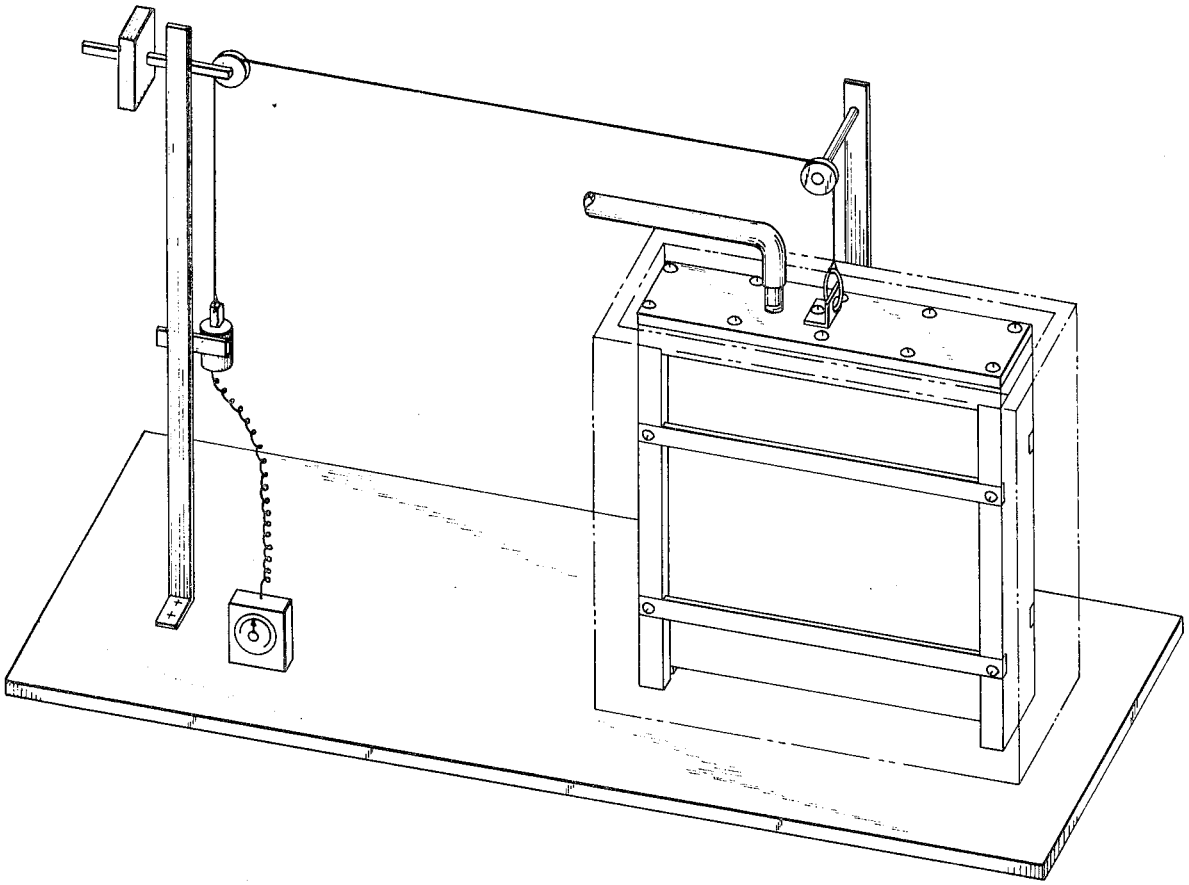

The file of this unexamined application may be inspected and copies thereof may be purchased (849 O.G. 1221, Apr. 9, 1968).